(12) United States Patent
Tsujimoto

(10) Patent No.: US 7,689,118 B2
(45) Date of Patent: Mar. 30, 2010

(54) IMAGE CAPTURE APPARATUS

(75) Inventor: Tokusuke Tsujimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 605 days.

(21) Appl. No.: 11/599,453

(22) Filed: Nov. 15, 2006

(65) Prior Publication Data

US 2007/0140683 A1    Jun. 21, 2007

(30) Foreign Application Priority Data

Dec. 16, 2005    (JP)   ............................ P2005-362841

(51) Int. Cl.
    *G03B 13/02*    (2006.01)
    *H04N 5/222*    (2006.01)
(52) U.S. Cl. ...................... 396/374; 348/333.01; 349/56
(58) Field of Classification Search ............ 348/333.01, 348/333.06; 349/56; 396/374, 378, 379
See application file for complete search history.

(56) References Cited

U.S. PATENT DOCUMENTS

| 4,977,456 A | * | 12/1990 | Furuya | .................. | 348/333.01 |
| 2002/0171748 A1 | * | 11/2002 | Kim | ...................... | 348/333.01 |

FOREIGN PATENT DOCUMENTS

| JP | 08-65552 | | 3/1996 |
| JP | 11271843 A | * | 10/1999 |
| JP | 2000278565 A | * | 10/2000 |
| JP | 2001211358 A | * | 8/2001 |
| JP | 2003107571 A | * | 4/2003 |
| JP | 2005189499 A | * | 7/2005 |

* cited by examiner

*Primary Examiner*—Christopher E Mahoney
*Assistant Examiner*—Leon W Rhodes
(74) *Attorney, Agent, or Firm*—Finnegan, Henderson, Farabow, Garrett & Dunner, L.L.P.

(57) ABSTRACT

An image capture apparatus has an electronic view finder assembly. The assembly has a casing including inner and outer casings; an accommodation spacing, an opening, a cover, an eye cup portion, a stopper, and a dust prevention cushion. The accommodation spacing accommodates the inner casing held in the same extension direction as the outer casing. The opening is provided in the outer casing for insertion of the inner casing into the accommodation spacing. The cover closes the opening. The eye cup portion is attached to a rearward end of the outer casing. A stopper stops forward movement of the inner casing accommodated in the accommodation spacing in the state of the opening closed by the cover. The dust prevention cushion is interposed in a compressed state between overall circumferential peripheries of respective rearwardly facing and forwardly facing wall faces of the inner and outer casings in the state where the forward movement of the inner casing is stopped by the stopper.

16 Claims, 12 Drawing Sheets

IMAGE CAPTURE APPARATUS

CROSS REFERENCES TO RELATED APPLICATIONS

The present invention contains subject matter related to Japanese Patent Application JP 2005-362841 filed in the Japanese Patent Office on Dec. 16, 2005, the entire contents of which being incorporated herein by reference.

BACKGROUND OF THE INVENTION

1. Field of the Invention

The present invention relates to an imaging apparatus including an electronic view finder assembly.

2. Description of the Related Art

Image capture apparatuses, such as video cameras, distributed or available on the market include those of the type including an electronic view finder assembly. Such an electronic view finder assembly is provided either fixedly or pivotably along the vertical direction.

An electronic view finder assembly of the above-described type includes the following members. The members are an liquid crystal display device that displays images generated in accordance with image capture signals of the image capture elements of the camera body on a display screen; a backlight that illuminates the liquid crystal display device; an optical system that magnifies of enlarges an image displayed on the display screen; and a casing that accommodates the liquid crystal display device, the back light, and the optical system (refer to Japanese Patent Laid-Open Publication No. 08-65552, for example). Casings of such previous electronic view finder assemblies are cylindrical in shape, and the structures thereof are grouped into the following types, for example. One type of the structure is such that components, such as a liquid crystal display device, a back light, and an optical system, are inserted and assembled into a casing along the axis line. The other type of the structure is such that the casing is separated into two, an upper half and lower half-units. In this case, components, such as a liquid crystal display device, a back light, and an optical system, are assembled into one of the half-units, and then the other half-unit is coupled thereto, thereby to complete the primary casing.

SUMMARY OF THE INVENTION

However, any one of the structures described above includes openings that permit signals for supplying power to, for example, the liquid crystal display device and the back light, to pass through a flexible substrate. As such, dust invades through the openings, and adheres to a display surface of the liquid crystal display device. Such dust visibly appears therein with an image when looking into the electronic view finder assembly, thereby producing a disadvantage in securing quality of display images.

The present invention is performed in view of the situations described above. Accordingly, it is desirous to provide an advantageous imaging device, when securing the protection-against-dust nature of electronic view finder assembly.

According to one embodiment of the present invention, an image capture apparatus includes an electronic view finder assembly. The electronic view finder assembly includes a liquid crystal display device that displays on a display surface an image generated in accordance with an image capture signal generated by an image capture element; a back light that illuminates the liquid crystal display device; and an optical system that magnifies the image that is to be displayed on the display surface. A casing of the electronic view finder assembly includes an inner casing that accommodates the liquid crystal display device and the back light, that is cylindrical in cross-sectional shape, and that extends in a forward-rearward direction; an outer casing that has a cylindrical shape having a cross section larger in size than a cross section of the inner casing and that extends in the forward-rearward direction; an accommodation spacing that is provided in an interior of the outer casing and that accommodates the inner casing in a state where an extension direction of the inner casing is the same as an extension direction of the outer casing; an opening that is formed in a wall portion of the outer casing extending along the extension direction of the outer casing and that is used to insert the inner casing into the accommodation spacing; a cover that closes the opening; an eye cup portion that accommodates the optical system and that is attached to a rearward end of the outer casing; a stopper that stops forward movement of the inner casing in a state where the inner casing is accommodated in the accommodation spacing and the opening is closed by the cover; and a dust prevention cushion interposed in a compressed state between an overall circumferential periphery of a rearwardly facing wall face of the inner casing and an overall circumferential periphery of a forwardly facing wall face of the outer casing inside the outer casing in a state where the forward movement of the inner casing is stopped by the stopper.

Thus, in the embodiment, the dust prevention cushion is interposed in the compressed state between the overall circumferential periphery of the rearwardly facing wall face of the inner casing and the overall circumferential periphery of the forwardly facing wall face of the outer casing. Thereby, even when dirt has intruded into the outer casing, the dust can be prevented from intruding into the outer casing.

Consequently, dust resistance of the electronic finder assembly can be secured, and dust can be prevented from adhering to the display surface of the display device. This is advantageous for securing the quality of the image displayed on the electronic view finder assembly.

Further, the electronic view finder assembly can be assembled in the manner that, after the inner casing in which components such as the backlight and the display unit are assembled is accommodated into the accommodation spacing of the outer casing, then the opening is closed by the cover. This is advantageous for simplifying the assembly work.

DETAILED DESCRIPTION OF THE PREFERRED EMBODIMENTS

First Embodiment

Embodiments of the present invention will be described with reference to the drawings.

Figure 1:
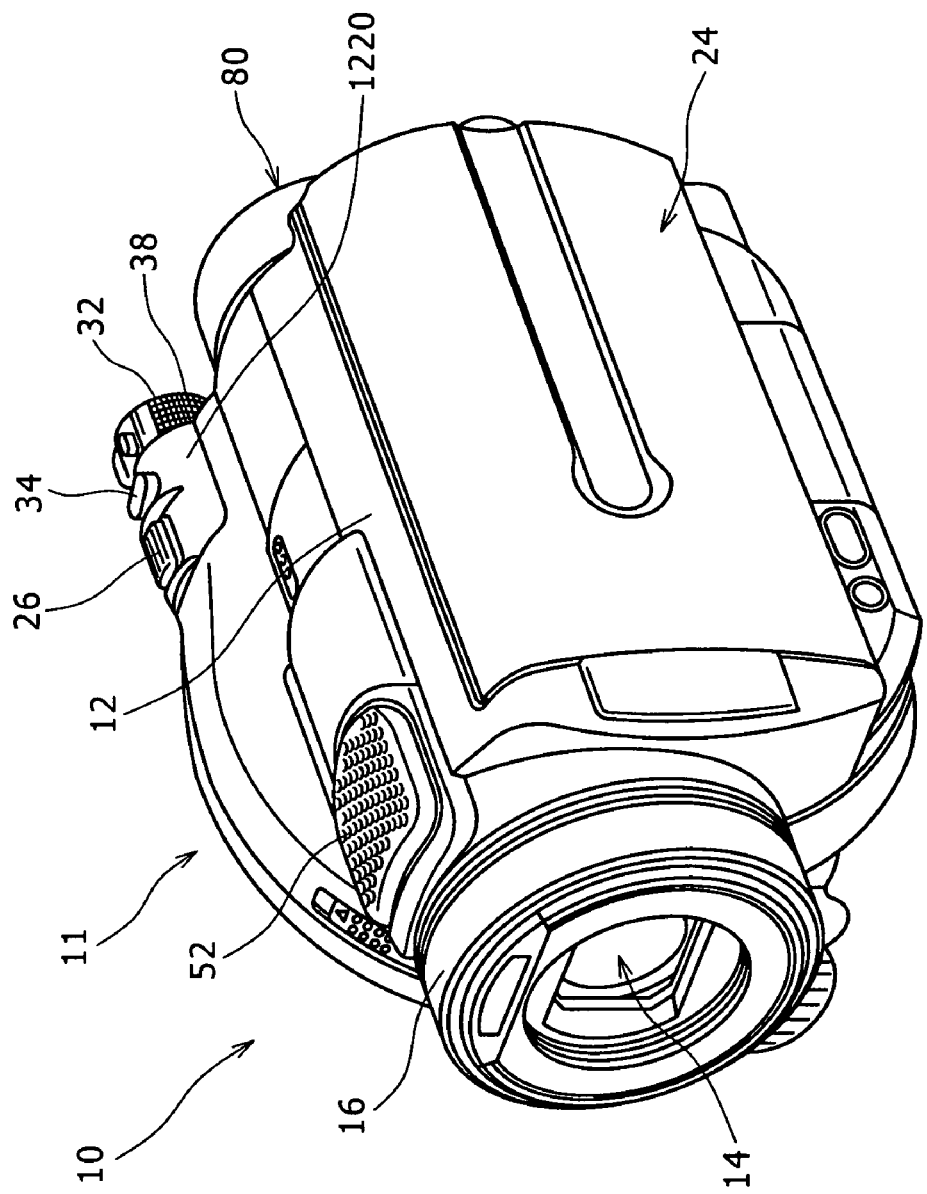
FIG. 1 is a perspective view showing an exterior configuration of an image capture apparatus according to a first embodiment.
Figure 2:
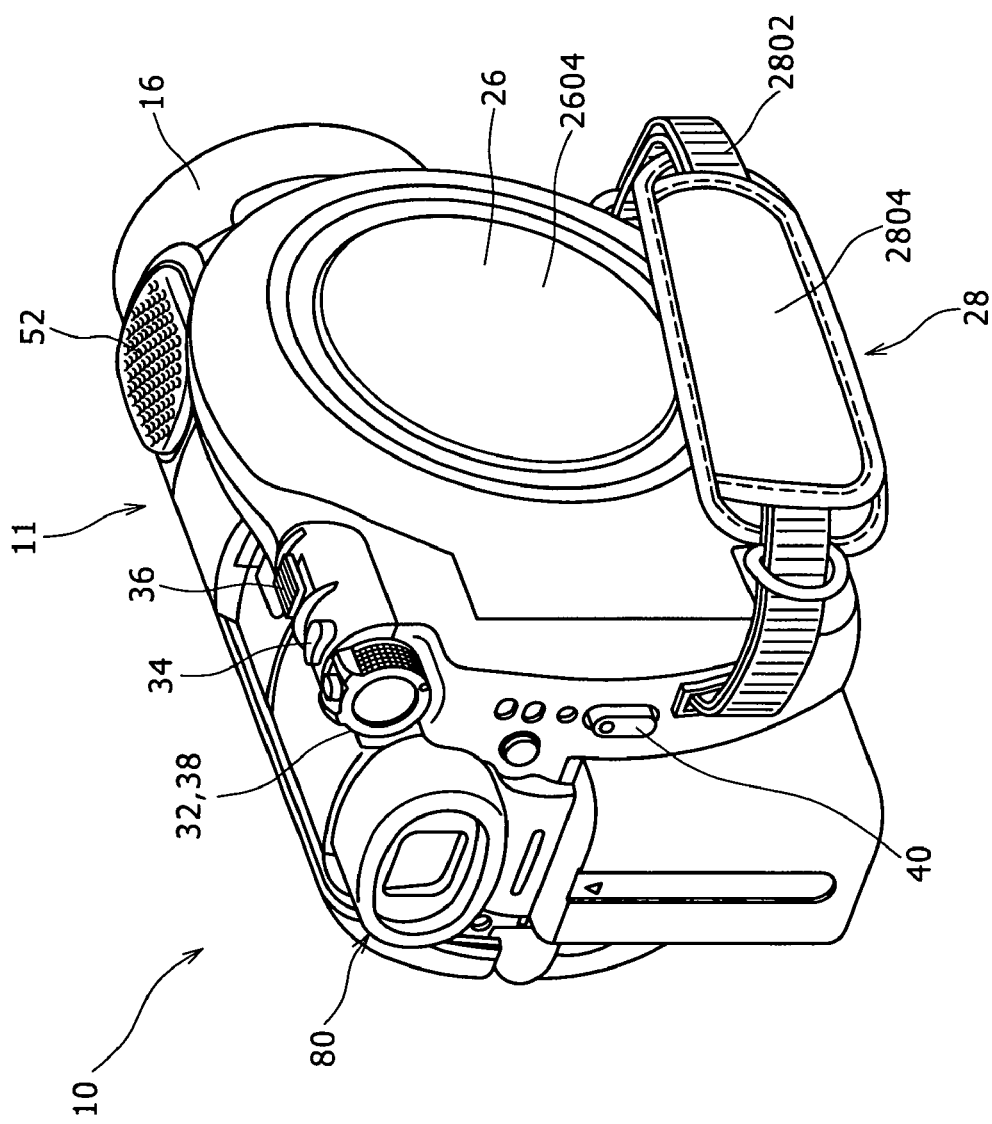
FIG. 2 is a perspective view showing the exterior configuration (viewed from a different direction) of the image capture apparatus according to the first embodiment.
Figure 3:
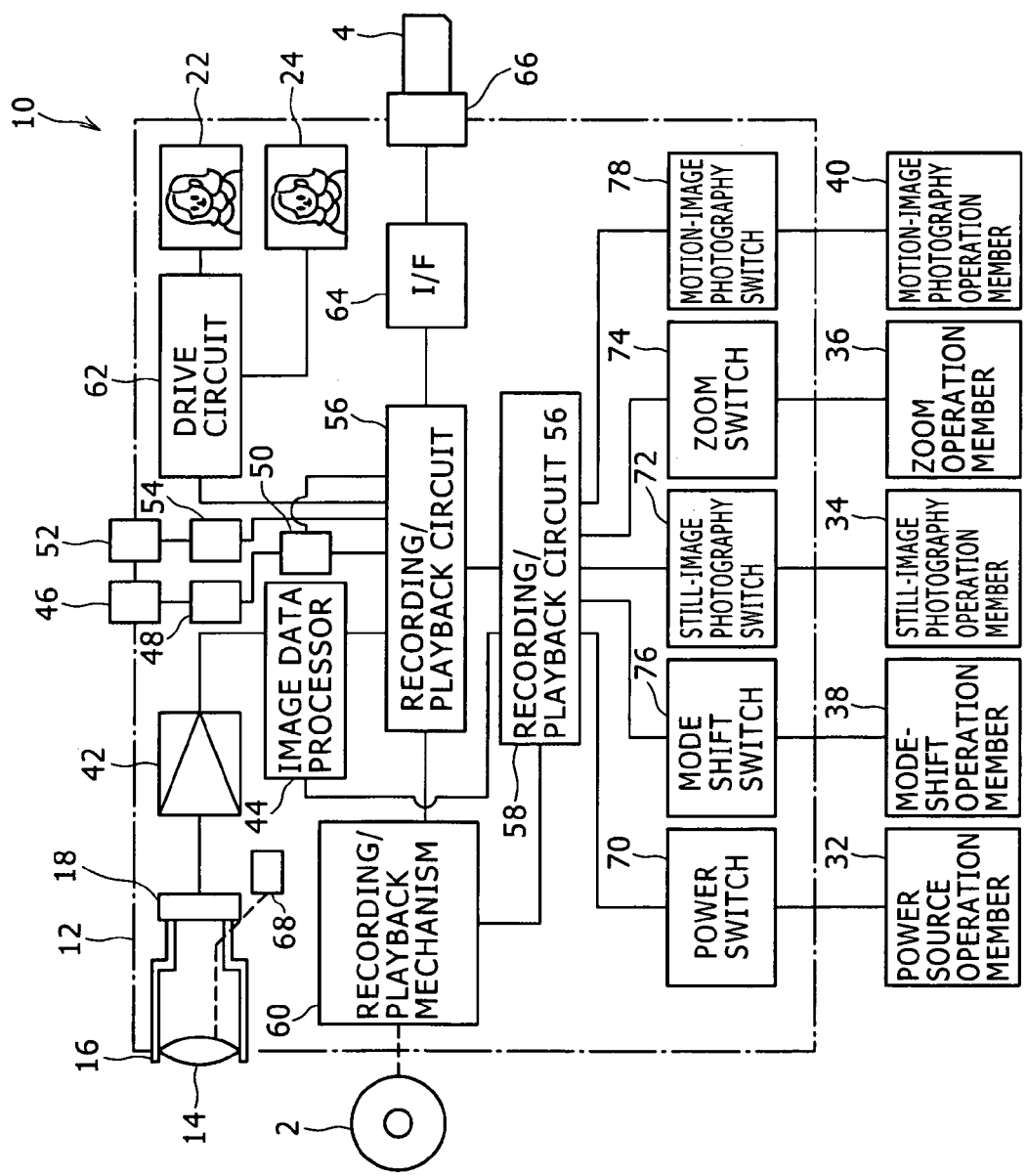
FIG. 3 is a block diagram showing the configuration of a control system of the image capture apparatus.

FIGS. 1 and 2, respectively, are perspective views showing an exterior configuration of an image capture device 10 of the first embodiment. FIG. 3 is a block diagram showing the configuration of a control system of the image capture apparatus 10.

As shown in FIGS. 1 and 2, the image capture device 10 according to the present embodiment is a video camera.

The image capture device 10 includes a camera body 11 and an electronic view finder assembly 80 provided in the camera body 11.

A casing 12 constituting the exterior of the camera body 11 has a larger length in a forward-rearward direction and a lager height in an up-and-down direction (or, vertical direction) than a width in a rightward-leftward direction. Throughout the Specification, the "left" and "right" refer to the direction when the image capture device 10 is viewed from the rearward direction. In addition, the side of a photographic subject along the optical axis direction is referred to as "forward direction," and the side of the image capture device 10 on the optical axis direction is referred to as "rearward direction."

In a forward portion of an upper portion of the casing 12, a lens barrel 16, in which a photography optical system 14 is assembled, extends to oppose a front face of the casing 12. The photography optical system 14 includes a zoom lens, in which a zoom ratio is tunable continuously or in series.

An image capture element 18 (refer to FIG. 3) for capturing a photographic subject image led by the photography optical system 14 is provided to a rear end of the lens barrel 16.

As shown in FIG. 1, a display panel 24 is provided in a left-hand side portion of the casing 12 to be openable or closable. The display panel 24 is formed of, for example, a liquid crystal display device, that displays, for example, a photographic subject image captured by the image capture element 18. In a closed mode, the display panel 24 is accommodated in accommodation recess portion 1202. A speaker 52 is provided to a bottom wall of the accommodation recess portion 1202.

As shown in FIG. 2, an accommodation portion 26 is provided in a righthand side portion of the casing 12. The accommodation portion 26 accommodates a detachable disk-like recording medium 2 (refer to FIG. 3) that records data, such as image and audio data, and is opened and closed by an opening/closing cover 2604.

As shown in FIGS. 2 and 3, a grip belt 28 extending along the forward-rearward direction is provided to a righthand side surface of the casing 12.

The grip belt 28 includes a belt body 2802 connected to forward and rear portions of the casing 12, and a hand-back pad 2804 covering a middle portion of the belt body 2802.

A microphone 52 for receiving audio is provided on in a forward portion of an upper surface of the casing 12.

As shown in FIGS. 1 and 2, the image capture apparatus 10 has operation members for executing various functions related to photography. The operation members include, for example, a power source operation member 32, a still-image photography operation member 34, a zoom operation member 36, a mode-shift operation member 38, and a motion-image photography operation member 40.

As shown in FIG. 3, the image capture device 10 includes, for example, an image signal amplification circuit 42, an image data processing unit 44, a microphone 46, a microphone amplification circuit 48, an audio data processing circuit 50, a speaker 52, an output amplification circuit 54, a recording/playback circuit 56, a control circuit 58, a recording/playback mechanism 60, a driving circuit 62, an interface circuit 64, a memory card slot 66, and a zoom driving unit 68.

In addition, the image capture device 10 includes a power switch 70, a still-image photography switch 72, a zoom switch 74, a mode shift switch 76, and a motion-image photography switch 78.

An image capture signal generated by an image capture element 18 is amplified in the image signal amplification circuit 42, and then is supplied to the image data processing unit 44.

The image data processor 44 carries out predetermined signal processing on an image capture signal, thereby to generate motion image data and still image data and to supply the data to the recording/playback circuit 56.

A voice signal received by the microphone 46 is amplified by the microphone amplification circuit 48, is subjected to predetermined signal processing in the audio data processing circuit 50, and then is supplied in the form of audio data to the recording/playback circuit 56.

In accordance with control of the control circuit 58, the recording/playback circuit 56 supplies to the recording/playback mechanism 60 the motion image data and still image data supplied from the image data processor 44 and the audio data supplied from the audio data processing circuit 50. The recording/playback mechanism 60 in turn records (writes) such motion image data, still image data, and audio data onto the disk-like recording medium 2, provided as a recording medium. In present embodiment, while an optical disk, such as a DVD-R (digital versatile disk-rewritable), is used for the disk-like recording medium 2, of course a disk other than the DVD-R, such an optical disk or magnetooptical disk, can be used.

In addition, the recording/playback circuit 56 records into a memory card 4 the motion image data and still image data, supplied from the image data processor 44, and the audio data, supplied from the audio data processing circuit 50, through the interface circuit 64. The memory card 4 is a memory card 4, which serves as a recording medium, inserted into the memory card slot 66.

In addition, the record recording/playback circuit 56 supplies motion image data and still image data, supplied from the image data processor 44, to the display panels 22 and 24 through the driving circuit 62, and causes the display panels 22 and 24 to display the data as images on respective screens of the display panels 22 and 24.

Further, the record recording/playback circuit 56 supplies motion image data and still image data, supplied from the memory card 4 through the interface circuit 64, to the display panels 22 and 24 through the driving circuit 62, and causes the display panels 22 and 24 to display the data as images on the respective screens. Concurrently, the record recording/playback circuit 56 supplies audio data, supplied from the memory card 4 through the interface circuit 64, to the speaker 52 through the output amplification circuit 54, and causes the speaker 52 to output audio.

Further, the record recording/playback circuit 56 supplies motion image data and still image data played back by the record playback mechanism 60 from the disk-like recording medium 2 to the display panels 22 and 24 through the driving circuit 62, and causes the display panels 22 and 24 to display images of the data. Concurrently, the recording/playback circuit 56 supplies audio data played back by the recording/playback mechanism 60 from the disk-like recording medium 2 to the speaker 52 through the output amplification circuit 54, and causes the speaker 52 to output audio.

The power switch 70 operates in response to operation of the power source operation member 32. The control circuit 58 controls ON/OFF of the image capture device 10 in accordance with the operation of the power switch 70.

The still-image photography switch 72 operates in response to operation of still-image photography operation member 34. In response to the operation of the still-image photography switch 72, the control circuit 58 gives instructions to the image data processor 44 and the recording/playback circuit 56. In accordance with the instructions, still image data supplied to the image data processor 44 is supplied to the recording/playback mechanism 60 from the recording/playback circuit 56. Thereby, the still image data is recorded onto the disk-like recording medium 2. Thus, the still-image photography operation member 34 functions as a so-called "shutter button."

The zoom switch 74 operates in response to operation of the zoom operation member 36. In response to the operation of the zoom switch 74, the control circuit 58 gives an instruction to the zoom driving unit 68. In accordance with the instruction, the zoom driving unit 68 moves the zoom lens of the photography optical system 14, thereby to cause the zoom ratio of the photography optical system 14 to change.

The mode shift switch 76 operates in response to operation of the mode-shift operation member 38. In response to the operation of the mode shift switch 76, the control circuit 58 gives an instruction to the image data processor 44, thereby to shift between a motion image photography mode and a still image photography mode. In the respective motion image photography mode and still image photography mode, the image data processor 44 generates motion image data and still image data.

More specifically, in the motion image photography mode, the motion image data generated by the image data processing part 44 is recorded on either the disk-like recording medium 2 or memory card 4 through the recording/playback circuit 56. In the still image photography mode, the still image data generated in the image data processing part 44 is recorded on the disk-like recording medium 2 or the memory card 4 through the recording/playback circuit 56.

The motion-image photography switch 78 operates in response to operation of the motion-image photography operation member 40. In accordance with the operation of the motion-image photography switch 78, the control circuit 58 controls recording of motion image data to start and stop. More specifically, the control circuit 58 gives instructions to the image data processor 44 and the recording/playback circuit 56 in accordance with the operation of the motion-image photography switch 78. In accordance with the instructions, motion image data supplied to the image data processor 44 from the image data processor 44 is supplied from the recording/playback circuit 56 to the recording/playback mechanism 60, thereby either to start operation of recording to the disk-like recording medium 2 or to stop the operation. Thus, the motion-image photography operation member 40 functions as a photography start/stop operation member.

The electronic view finder assembly 80 according to the embodiment will now be described herebelow.

Figure 4:
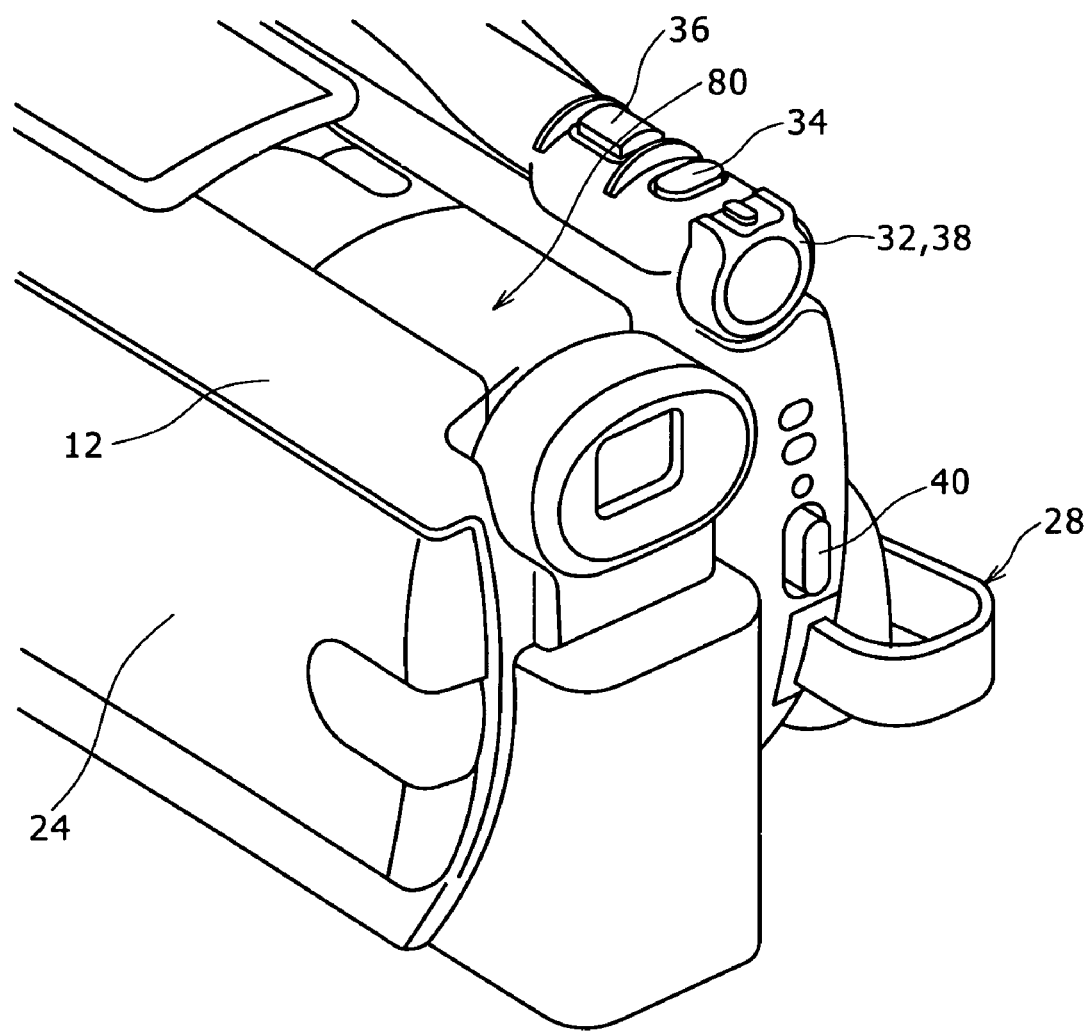
FIG. 4 is a perspective view of an electronic view finder assembly located in an accommodation position.
Figure 5:
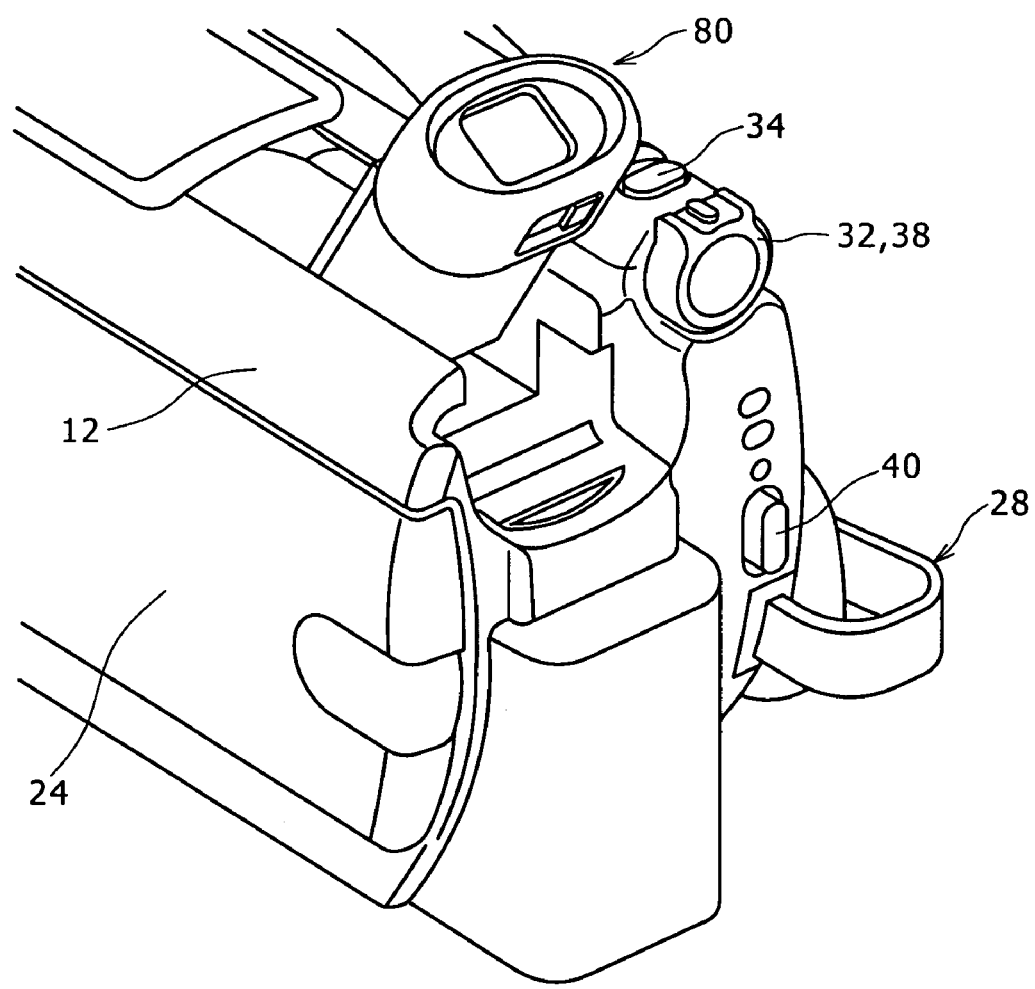
FIG. 5 is a perspective view of the electronic view finder assembly located in an upper position.

FIG. 4 is a perspective view of the electronic view finder assembly 80 located in an accommodation position. FIG. 5 is a perspective view of the electronic view finder assembly 80 located in an upper position.

The electronic view finder assembly 80 viewfinds a photographic subject image captured by the image capture element 18 (FIG. 3). As shown in FIG. 2, the electronic view finder assembly 80 is provided in a rear portion of an upper face of the camera body 11 (casing 12).

The electronic view finder assembly 80 is provided in the manner that the forward end thereof is pivotally joined to the camera body 11 to be vertically pivotable between the accommodation position shown in FIG. 4 and the upper position shown in FIG. 5. Thus, the electronic view finder assembly 80 is provided to be usable by being pivoted to an easy-to-viewfind position corresponding to the direction of the photographic subject and a user's posture.

Figure 6:
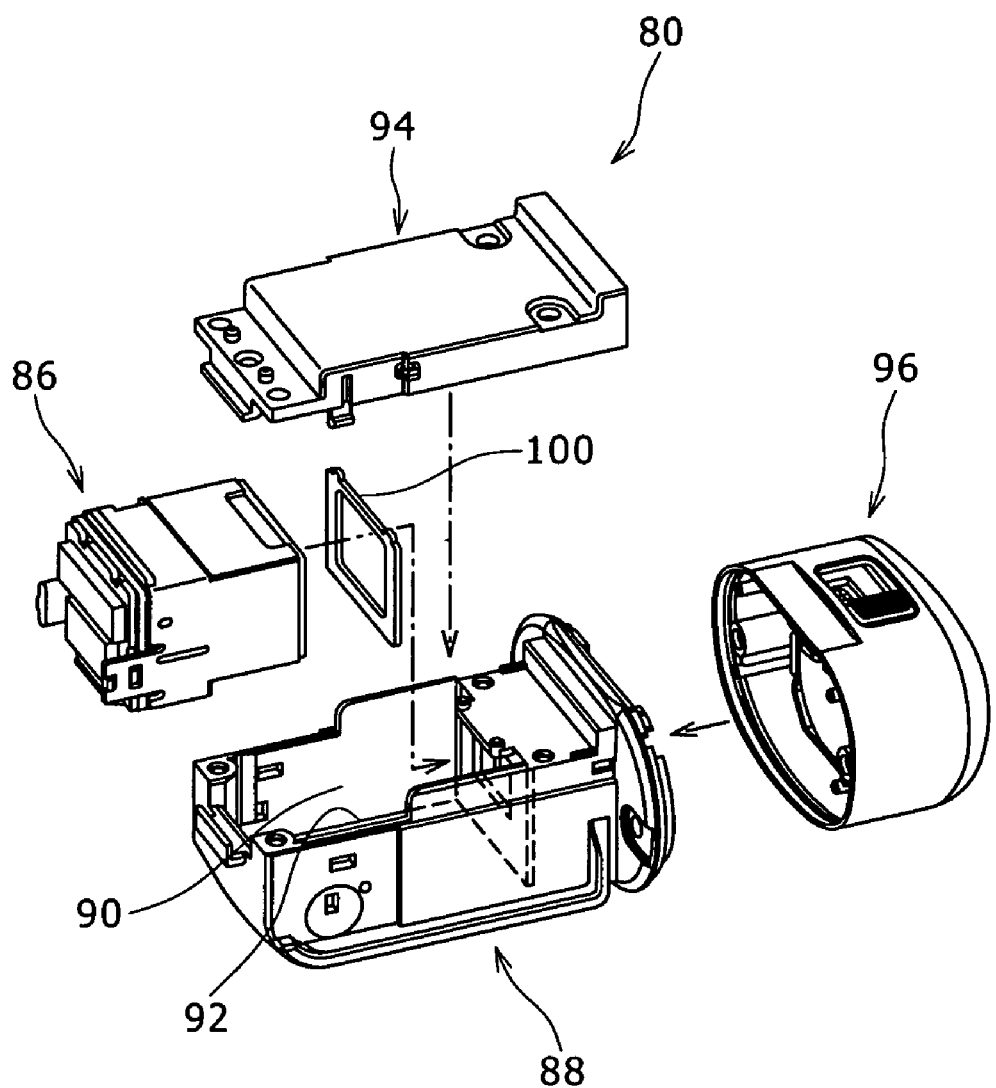
FIG. 6 is an exploded perspective view of the electronic view finder assembly.
Figure 7:
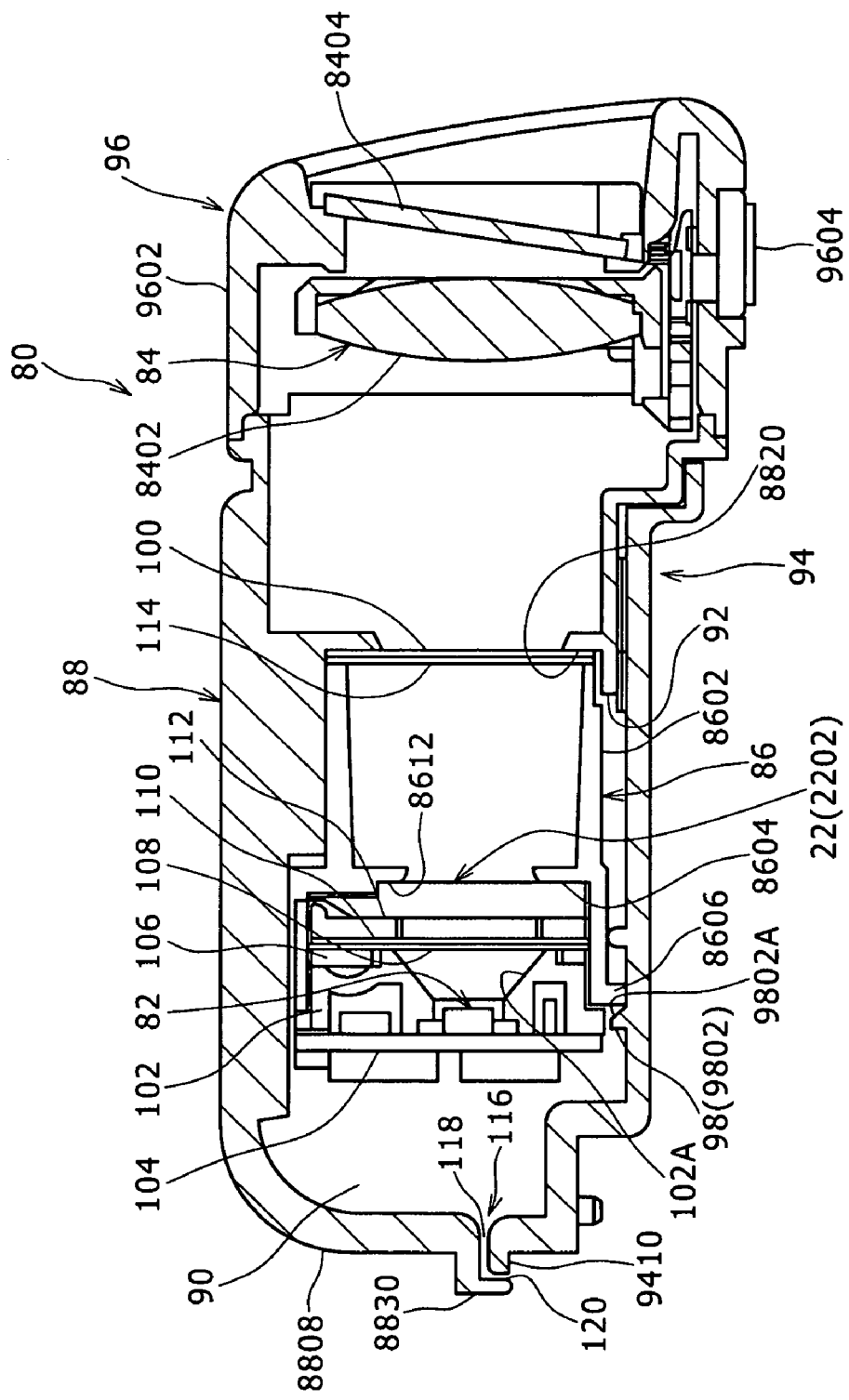
FIG. 7 is a cross sectional view of the electronic view finder assembly.
Figure 8:
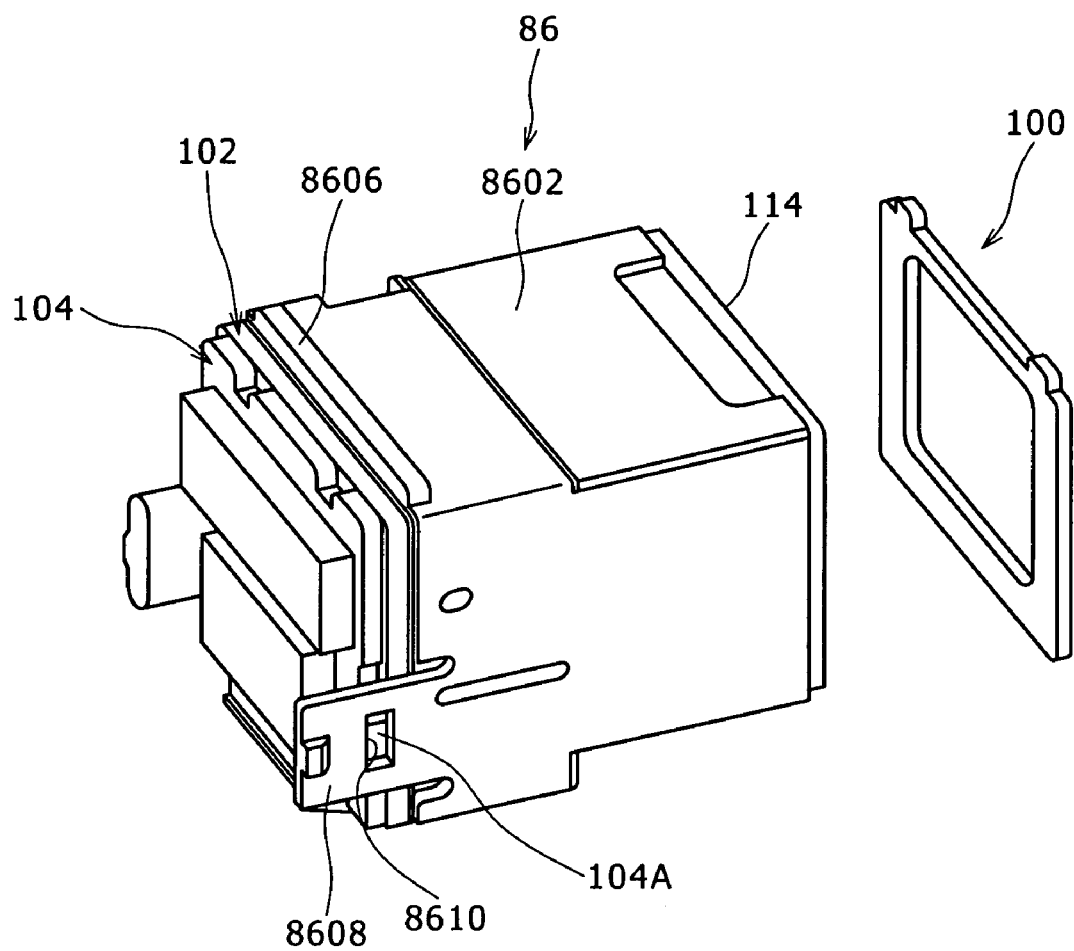
FIG. 8 is a perspective view of an inner casing.
Figure 9:
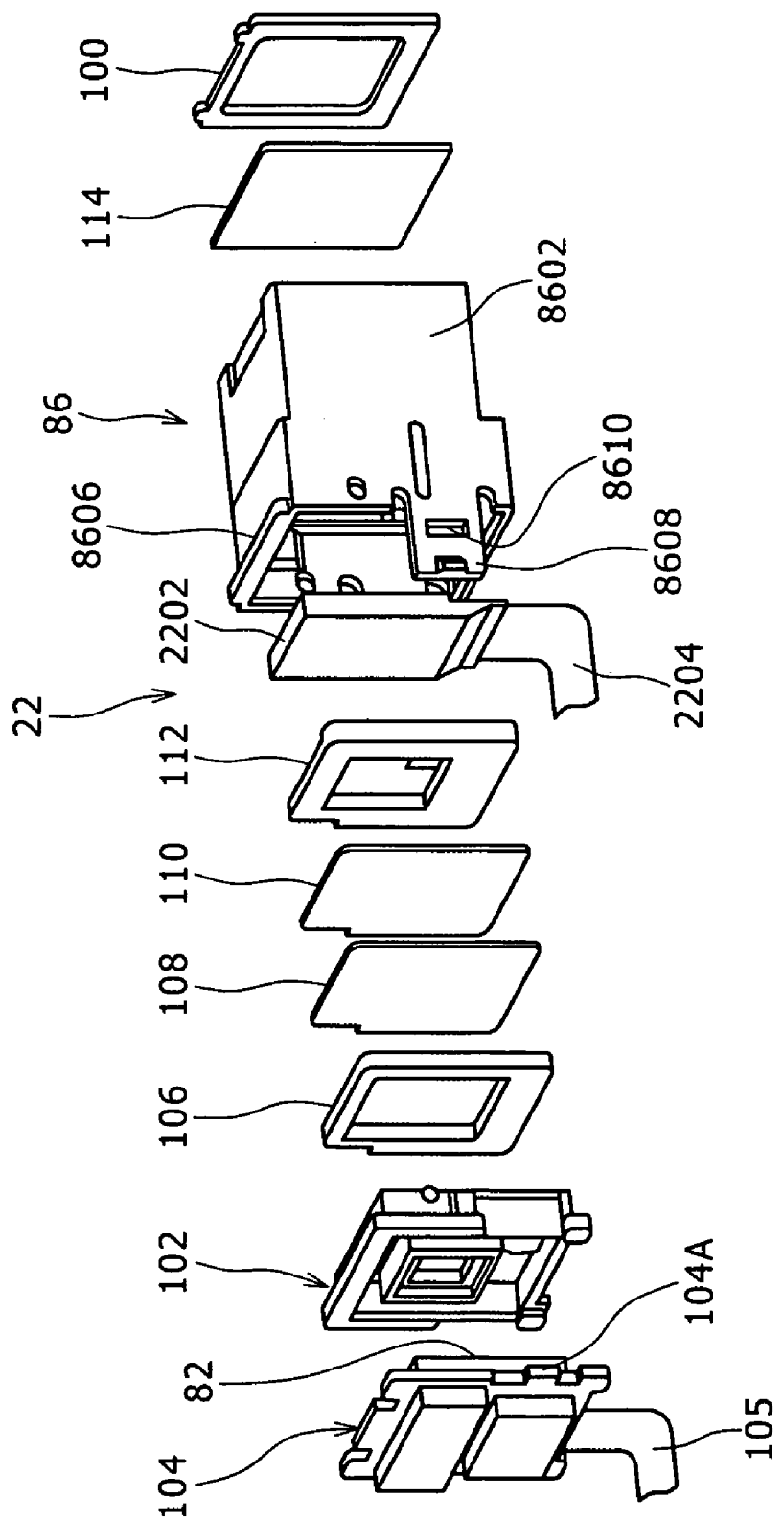
FIG. 9 is an exploded perspective view components assembled into the inner casing.
Figure 10:
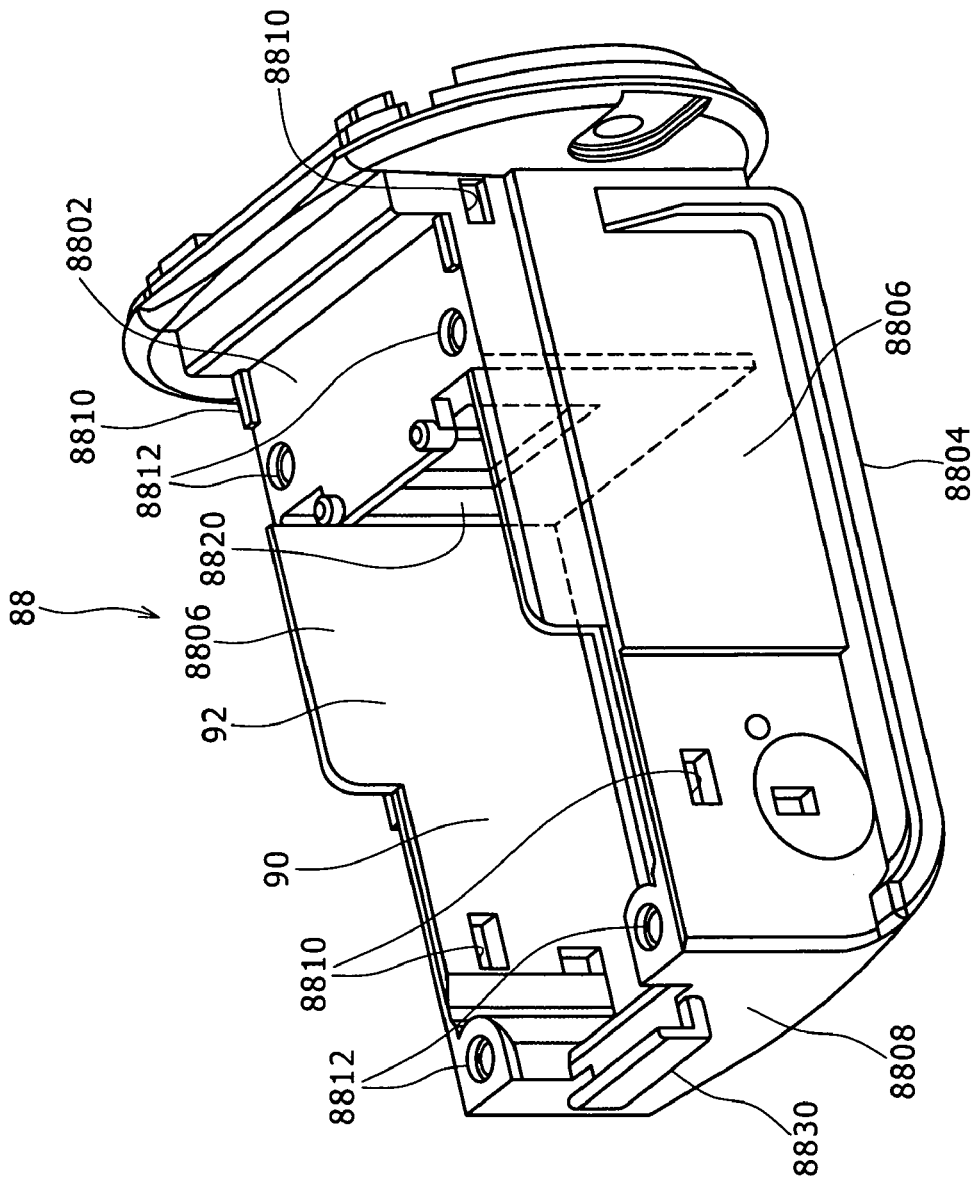
FIG. 10 is a perspective view of an outer casing.
Figure 11:
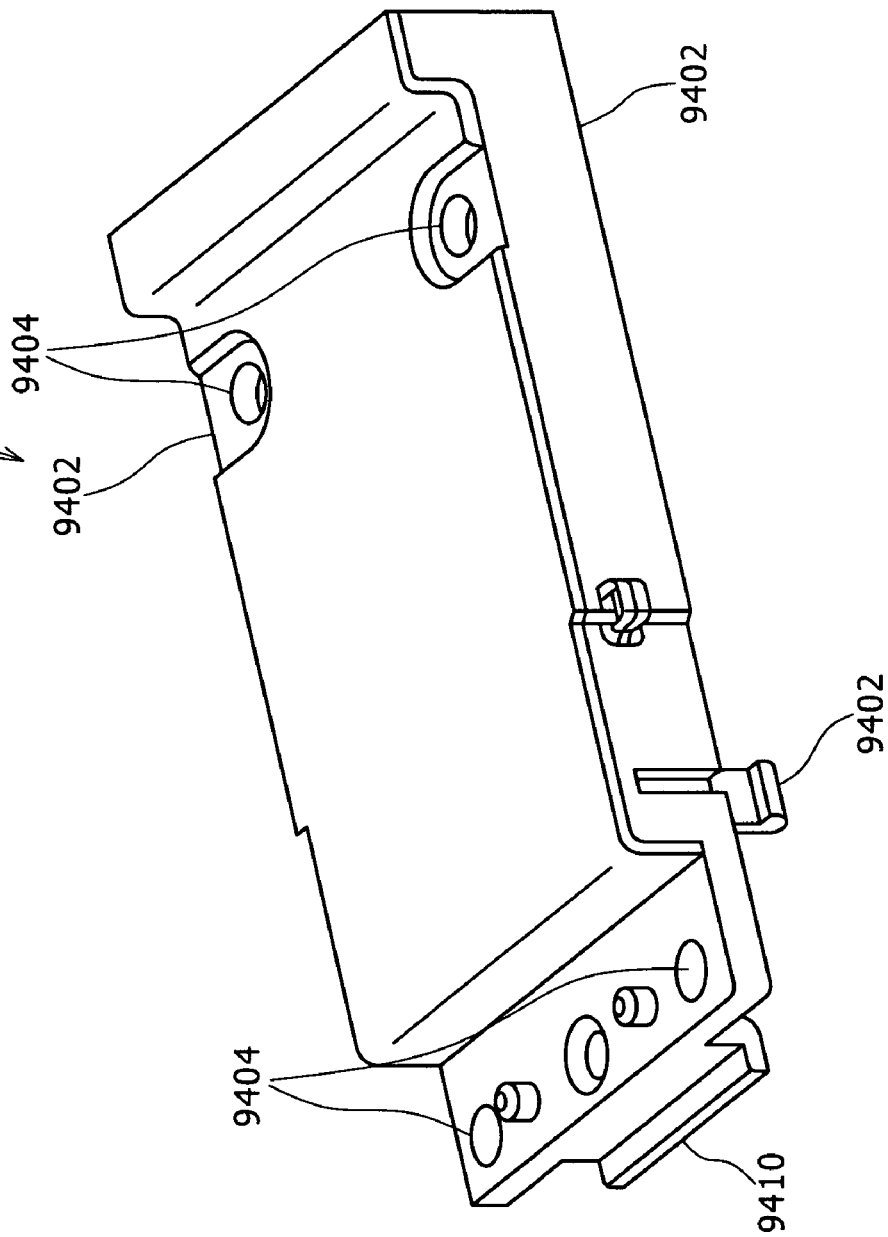
FIG. 11 is a perspective view of a cover.
Figure 12:
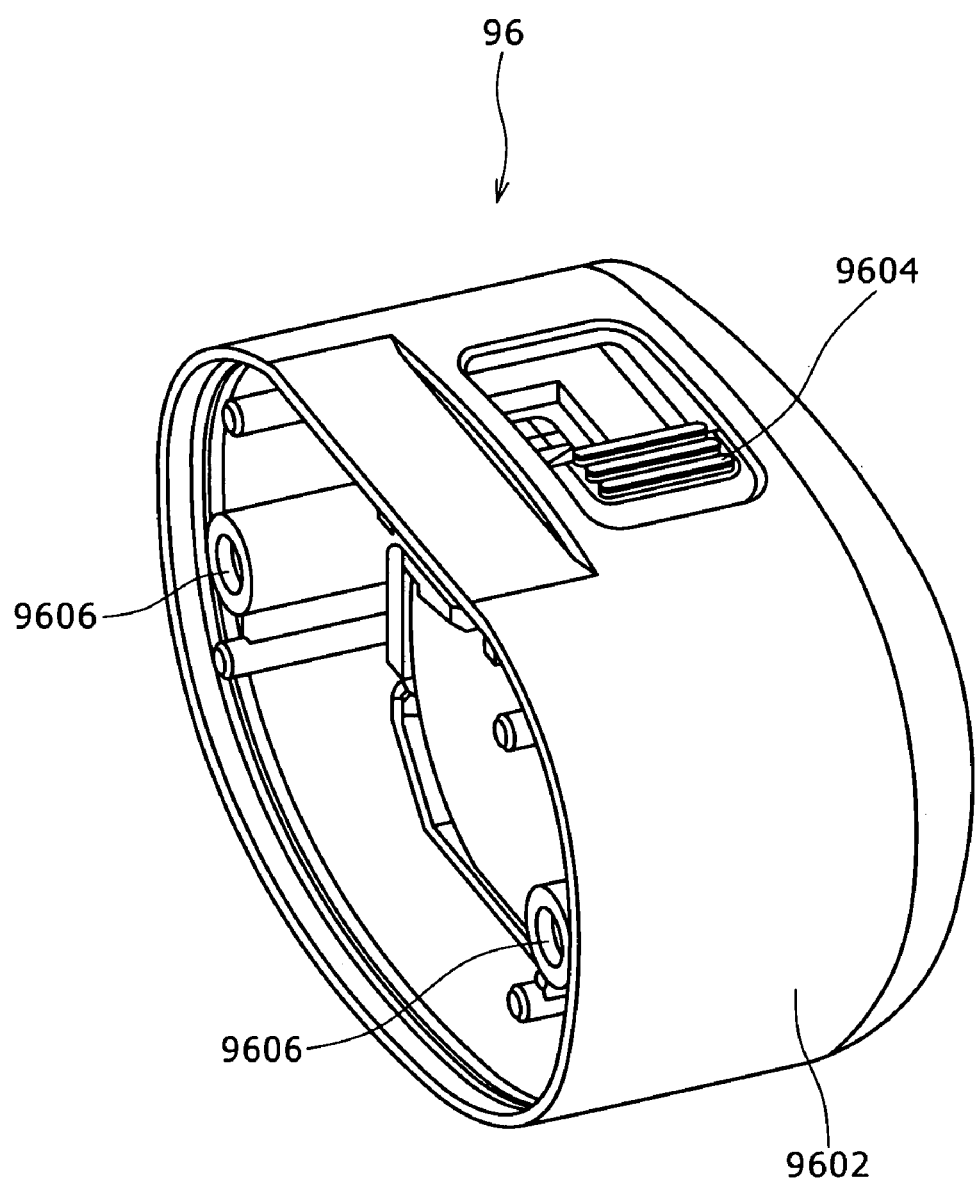
FIG. 12 is a perspective view of an eye cup portion.

FIG. 6 is the decomposition perspective view of the electronic view finder assembly 80. FIG. 7 is a cross sectional view of the electronic view finder assembly 80, FIG. 8 is a perspective view of an inner casing 86. FIG. 9 is an exploded perspective view showing components assembled into the inner casing 86. FIG. 10 is a perspective view of an outer casing 88. FIG. 11 is a perspective view of a cover 94. FIG. 12 is a perspective view of an eye cup portion 96.

With reference to FIGS. 6 and 7, the electronic view finder assembly 80 includes the display panel 22 (described above and corresponding to a liquid crystal display device defined in the claims), a back light 82, an optical system 84, the inner casing 86, the outer casing 88, an accommodation spacing 90, an opening 92, a cover 94, an eye cup portion 96, a stopper 98, and a dust prevention cushion 100.

As shown in FIGS. 7 to 9, the inner casing 86 is rectangularly cylindrical in cross-sectional shape, and extends forward and rearward.

The inner casing 86 has a length larger than the left-right width and the height in the vertical direction.

As shown in FIG. 7, the inner casing 86 has four wall portions 8602, namely, a lower wall portion 8602 and an upper wall portion 8602 that extending in the horizontal direction, and lefthand and righthand sidewall portions 8602. Inside the wall portions 8602, a wall portion 8604 is provided across all peripheries of inner faces in a central portion along the forward-rearward direction, and the wall portion 8604 extends in the form a rectangular frame inside the inner casing 86.

A rectangular recess portion 8612 is formed in a surface area where the wall portion 8604 is exposed ahead.

As shown in FIGS. 8 and 9, a forwardly protruding engagement protrusion portion 8606 that extends along the leftward-rightward direction is provided to the forward end of the wall portion 8602 constituting the lower wall.

Attachment pieces 8608 respectively protrude forward in lower portions of forward ends of two wall portions 8602 that respectively constitute lefthand and righthand sidewalls. Engagement openings 8610 are provided to the respective attachment pieces 8608.

As shown in FIGS. 7 to 9, a lamp guide 102 is disposed in the forward end of the inner casing 86, and a substrate 104 is disposed ahead of the lamp guide 102.

The back light 82 is mounted in a rear surface of the substrate 104. In the present embodiment, the back light 82 is formed of a light emitting diode.

The lamp guide 102 has an inner surface 102A having a shape as a rectangular frame and facing the back light 82. Light emitted from the back light 82 is reflected off of an inner surface 102A, and then is led rearward.

Electronic components constituting of a drive circuit of the back light 82 are mounted on the front surface of the substrate 104. In addition, a flexible substrate 105 for supplying electric power to the drive circuit is connected to the substrate 104.

As shown in FIG. 8, the substrate 104 is stacked on a front surface of the lamp guide 102. Engagement pieces 104A respectively protruding from two mutually opposing sides of the substrate 104 are engaged with the engagement openings 8610, whereby the substrate 104 is attached to the forward end of the inner casing 86.

Thereby, the lamp guide 102 is disposed to the forward end of the inner casing 86 in the state that the lamp guide 102 is inserted between the substrate 104 and the forward end of the inner casing 86.

In the event that the substrate 104 and the lamp guide 102 are thus disposed to the forward end of the inner casing 86, a cushion 106, a diffusion board 108, a first polarizing plate 110, a spacer 112, and a display body 2202 are disposed interior of the inner casing 86.

As shown in FIGS. 7 to 9, a diffusion plate 108 is stacked on the rear face of the lamp guide 102 via the cushion 106 having a rectangular shape. The diffusion plate 108 uniformly diffuses the light incoming from the back light 82.

The first polarizing plate 110 is stacked on the rear face of the diffusion plate 108.

The display body 2202 is stacked on the rear surface of the first polarizing plate 108 via the spacer 112 having the shape like a rectangular frame.

The display body 2202 has two glass boards between which liquid crystal is enclosed, and a flexible substrate 2204 connected to electrodes formed to the respective glass boards. The flexible substrate 2204 is thus provided to supply the electrodes with drive signals supplied from the drive circuit for displaying images.

The display body 2202 is accommodated in the recess portion 8612. In this state, positioning in the direction perpendicular to the thickness direction of the display body 2202 is carried out.

More specifically, when the substrate 104 and the lamp guide 102 are disposed to the forward end of the inner casing 86, the cushion 106, the diffusion plate 108, the first polarizing plate 110, the spacer 112, and the display body 2202 are disposed interior of the inner casing 86 through the recess portion 8612. In this case, the cushion 106 is compressed, and the disposed components are clamped, by elastic forces of the cushion 106, between the substrate 104 and the rectangular recess portion 8612, whereby the components are retained in the inner casing 86.

A second polarizing plate 114 is attached to the rear end of the inner casing 86. The second polarizing plate 114 faces the rear surface of the display body 2202, that is, a display surface.

In the present embodiment, the display panel 22 is configured to include the display body 2202, the first polarizing plate 110, and the second polarizing plate 114.

As shown in FIG. 10, the outer casing 88 has a shape as a cylinder having a cross section larger in size than the cross section of the inner casing 86, and extends in the forward-rearward direction.

In addition, the outer casing 88 has a lower wall 8802, an upper wall 8804, and the lefthand and righthand sidewalls 8806, thereby having a cross section having a shape as a rectangle frame.

A front wall 8808 that connects between the forward end of the upper wall 8804 and the forward ends of the sidewalls 8806 is provided to the forward end of the outer casing 88.

The lower wall 8802 is located in a near-rear end portion of the outer casing 88. A plurality of engagement recess portions 8810 and a plurality of screw holes 8812 are provided to the lefthand and righthand sidewalls 8806.

In the present embodiment, a portion to which the electronic view finder assembly 80 is pivotally joined is located near the forward end of the outer casing 88.

As shown in FIGS. 7 and 10, the accommodation spacing 90 is provided interior of the outer casing 88. More specifically, the accommodation spacing 90 is provided such that the extension direction of the inner casing 86 is the same as the extension direction of the outer casing 88. In present embodiment, the accommodation spacing 90 is provided near the forward end of the outer casing 88.

The opening 92 extends from the forward end of the lower wall 8802 to the lower end of the front wall 8808. More specifically, the opening 92 is formed in the wall portion of the outer casing 88 (which wall portion extends along the extension direction of the outer casing 88) such that the inner casing 86 is inserted into the accommodation spacing 90.

More specifically, the opening 92 extends with a left-right width larger than the left-right width of the inner casing 86 and with a front-rear length larger than the front-rear length of the inner casing 86. Since the opening 92 is thus formed, the inner casing 86 can be inserted into the accommodation spacing 90 in the state that the extension direction of the inner casing 86 is the same as the extension direction of the outer casing 88.

An abutment wall 8820 is expansively formed on an inner face where the outer casing 88 faces the accommodation spacing 90 in a portion located rearward of a portion where the opening 92 is formed. Thereby, the abutment wall 8820 is formed to expand on an overall periphery of the inner face in the direction perpendicular to the extension direction of the outer casing 88 and to be integral with the outer casing 88.

As shown in FIGS. 6, 7, and 11, the cover 94 has the size and shape to close the opening 92.

The cover 94 has a plurality of engagement protrusion portions 9402. The engagement protrusion portions 9402, respectively, engage the engagement recess portions 8810 of the outer casing 88 shown in FIG. 10. The cover 94 is positioned in the state where the opening 92 is closed. In addition, a plurality of screw insertion holes 9404 formed in the cover 94 engage the screw holes 8812 of the outer casing 88. In this state, the cover 94 is attached to the outer casing 88.

As shown in FIG. 7, the stopper 98 of the inner casing 86 is accommodated in the accommodation spacing 90. The stopper 98 prevents movement of the inner casing 86 (i.e., forward movement of the inner casing 86 in the state where the opening 92 is closed by the cover 94).

In the present embodiment, the stopper 98 is formed of a stopper wall 9802 that is an inner face where the cover 94 faces the accommodation spacing 90 and that is formed to expand in the direction perpendicular to the extension direction of the outer casing 88 and to be integral with the cover 94.

The stopper wall 9802 has a stopper face 9802A capable of abutting on the forward end of the inner casing 86. The stopper side 9802A has a sloped surface changing in shape towards the side of the interior of the accommodation spacing 90.

More specifically, the stopper wall 9802 (stopper face 9802A) engages the engagement protrusion portion 8606 of the inner casing 86. In this state, the inner casing 86 moves back through the engagement protrusion portions 8606. Since the inner casing 86 is thereby accommodated into the accommodation spacing 90, the inner casing 86 is prevented from moving forward.

With reference to FIG. 7, the dust prevention cushion 100 is provided as described hereinbelow. The dust prevention cushion 100 is prevented by the stopper 98 from moving ahead of the inner casing 86. In this state, the dust prevention cushion 100 is compressed between an overall circumferential periphery of a rearwardly facing wall face of the inner casing 86 and an overall circumferential periphery of a rearwardly facing wall face of the outer casing 88.

In the present embodiment, the overall circumferential periphery of the rearwardly facing wall face of the inner casing 86 is the overall circumferential periphery of a rear end face of the sidewall (wall portion 8602) of the inner casing 86. In addition, the overall circumferential periphery of the forwardly facing wall face of the outer casing 88 is the overall periphery of a forwardly facing face of the abutment wall 8820.

As shown in FIG. 7, projection walls 8830 and 9410, respectively, are forward-projectively provided to the forward ends of the front wall 8808 and the cover 94. The projection walls 8830 and 9410 oppose one another in the state that the opening 92 is closed by the cover 94. A substrate insertion spacing 116 is formed between the projection wall 8830 of the front wall 8808 and the projection wall 9410 of the cover 94.

The flexible substrate 105, 2204 is passed through the substrate insertion spacing 116, thereby to extend internally and externally of the outer casing 88 of the electronic view finder assembly 80.

The substrate insertion spacing 116 includes a forward-rearward extension portion 118 and a vertical extension portion 120. The forward-rearward extension portion 118 extends forward and rearward, has a rear end communicates with the interior of the outer casing 88 of the electronic view finder assembly 80. The vertical extension portion 120 extends downward from a forward end of the forward-rearward extension portion 118, and has a lower end open to the outside.

As shown in FIGS. 6, 7, and 12, eye cup portion 96 the eye cup portion 96 is attached to the rear end of the outer casing 88.

The eye cup portion 96 has an annular portion 9602, which annularly extending. A lens 8402, which constitutes the optical system 84, and a cover glass 8404, are accommodated in the annular portion 9602.

The lens 8402 expands or magnifies an image (displayed on the display screen of the display body 2202). The lens 8402 is provided movable along the optical axis direction. When an operation member 9604 is moved leftward or rightward, the lens 8402 is moved along the optical axis direction, thereby to enable dioptric tuning to be carried out.

The cover glass 8404 is disposed rearward of the lens 8402, thereby to protect the lens 8402.

Where the forward end of the eye cup portion 96 and the rearward end of the outer casing 88 are fitted to one another, screws inserted from the outer casing 88 engage screw holes 9606 of the eye cup portion 96. In this manner, the eye cup portion 96 is attached to the outer casing 88.

According to the present embodiment, the dust prevention cushion 100 is interposed in the compressed state between the overall circumferential periphery of the rearwardly facing wall face of the inner casing 86 and the overall circumferential periphery of the forwardly facing wall face of the outer casing 88. Thereby, even when dust has intruded into the outer casing 88, the dust can be prevented from intruding into the outer casing 88 from the overall rearward end periphery of the rearwardly facing inner casing 86.

Consequently, dust resistance of the electronic finder assembly 80 can be secured, and dust can be prevented from adhering to the display surface of the display panel 22. This is advantageous for securing the quality of the image displayed on the electronic view finder assembly 80.

Further, according to the present embodiment, after the inner casing, in which components such as the back light 82 and the display unit 22, are assembled, is accommodated into the accommodation spacing 90 of the outer casing 88, then the opening 92 is closed by the cover 94. In this state, the electronic view finder assembly 80 can be assembled. This is advantageous for simplifying the assembly work.

Further, the inner casing 86 is inserted in the accommodation spacing 90 from the opening 92 (formed to the wall portion extending along the extension direction of the outer casing 88 under the lower face of the outer casing 88), and the opening 92 is closed by the cover 94. As such, compared with the previous case in which the casing is configured by joining two half-units (sub-casings) together, the joint of the opening 92 and the cover 94 is located in an inconspicuous portion. This is advantageous for improving the exterior appearance of the electronic view finder assembly 80.

In the present embodiment, although description has been made with reference to the configuration using the recording media or mediums, such as the optical disk (disk-shaped recording medium) and memory card, the recording mediums are not limited thereto. However, the recording medium may be any one of, for example, a tape-like recording medium (such as magnetic tape), a detachable hard disk drive, and a hard disk drive and semiconductor memory built into the casing 12.

Further, while the present embodiment has been described with reference to the configuration in which the image capture device 10 performs both recording and playback of image data such as motion image data and still image data, the configuration may be of the type that performs only recording of image data such as motion image data and still image data.

It should be understood by those skilled in the art that various modifications, combinations, sub-combinations and alterations may occur depending on design requirements and other factors insofar as they are within the scope of the appended claims or the equivalents thereof.

What is claimed is:

1. An image capture apparatus including an electronic view finder assembly comprising:
   a liquid crystal display device that displays on a display surface an image generated by an image capture element;
   a back light that illuminates the liquid crystal display device;
   an optical system that magnifies the image that is to be displayed on the display surface; and
   a casing comprising:
      an inner casing that accommodates the liquid crystal display device and the back light, wherein the inner casing is cylindrical in cross-sectional shape and extends in a forward-rearward direction;
      an outer casing having a cylindrical shape and a cross section larger in size than a cross section of the inner casing, wherein the outer casing extends in the forward-rearward direction;
      an accommodation spacing that is provided in an interior of the outer casing and that accommodates the inner casing in a state where an extension direction of the inner casing is the same as an extension direction of the outer casing;

an opening that is formed in a wall portion of the outer casing extending along the extension direction of the outer casing and that is used to insert the inner casing into the accommodation spacing;

a cover that closes the opening;

an eye cup portion that accommodates the optical system and that is attached to a rearward end of the outer casing;

a stopper that stops forward movement of the inner casing in a state where the inner casing is accommodated in the accommodation spacing and the opening is closed by the cover, the stopper being formed of a stopper wall that is placed in the accommodation spacing and above the cover such that the stopper wall expands in a direction approximately perpendicular to the extension direction of the outer casing, wherein the stopper wall has a stopper face capable of abutting on a forward end of the inner casing, the stopper face being formed of a sloped surface changing in shape towards a side of an interior of the accommodation spacing; and a dust prevention cushion interposed in a compressed state between an overall circumferential periphery of a rearwardly facing wall face of the inner casing and an overall circumferential periphery of a forwardly facing wall face of the outer casing inside the outer casing in a state where the forward movement of the inner casing is stopped by the stopper.

2. An image capture apparatus according to claim 1, wherein:
the inner casing has a larger length in the forward-rearward than a left-right width thereof; and
the opening extends with a left-right width larger than the left-right width of the inner casing and with a front-rear length larger than the front-rear length of the inner casing.

3. An image capture apparatus according to claim 1, wherein the accommodation spacing is provided close to a forward end of the outer casing in the outer casing.

4. An image capture apparatus according to claim 1, wherein:
the overall circumferential periphery of the rearwardly facing wall face of the inner casing is an overall periphery of a rear end face of the inner casing;
an abutment wall is expansively formed on an inner face where the outer casing faces the accommodation spacing in a portion located rearward of a portion where the opening is formed, to expand on an overall periphery of the inner face in the direction perpendicular to the extension direction of the outer casing and to be integral with the outer casing; and
the overall circumferential periphery of the forwardly facing wall face of the outer casing is an overall circumferential periphery of a forwardly facing face of the abutment wall.

5. An image capture apparatus according to claim 1, wherein:
the outer casing has a cross section shaped as a rectangular frame formed from a lower wall, an upper wall, a lefthand sidewall, and a righthand sidewall;
a front wall connecting between a forward end of the upper wall and forward ends of the lefthand and righthand sidewalls;
the lower wall is located in a near-rear end portion of the outer casing; and
the opening extends from a forward end of the lower wall to a lower end of the front wall between lower ends of the lefthand and righthand sidewalls.

6. An image capture apparatus according to claim 5, wherein:
flexible substrates for signal transfer and power supply are connected to the liquid crystal display device and the back light;
projection walls are forward-projectively provided to forward ends of the front wall to extend horizontally and to oppose one another in a state that the opening is closed by the cover;
a substrate insertion spacing is formed between the projection wall of the front wall and the projection wall of the cover; and
the flexible substrates are each passed through the substrate insertion spacing, thereby to extend internally and externally of the outer casing.

7. An image capture apparatus according to claim 6, wherein:
the substrate insertion spacing includes a forward-rearward extention portion and a vertical extention portion:
the forward-rearward extention portion extends forward and rearward and has a rear end communicating with the interior of the outer casing; and
the vertical extension portion extends downward from a forward end of the forward-rearward extension portion and has a lower end open to the outside.

8. An image capture apparatus according to claim 1, further comprising a camera body, wherein:
the electronic view finder assembly is provided in a rear portion of an upper face of the camera body;
the forward end of the outer casing is pivotally joined to the camera body to be vertically pivotable; and
the opening is provided to a lower face where the outer casing faces downward.

9. An image capture apparatus including an electronic view finder assembly comprising:
a liquid crystal display device that displays on a display surface an image generated by an image capture element;
a back light that illuminates the liquid crystal display device;
an optical system that magnifies the image that is to be displayed on the display surface; and
a casing comprising:
an inner casing that accommodates the liquid crystal display device and the back light, wherein the inner casing is cylindrical in cross-sectional shape and extends in a forward-rearward direction;
an outer casing having a cylindrical shape and a cross section larger in size than a cross section of the inner casing, wherein the outer casing extends in the forward-rearward direction;
an accommodation spacing that is provided in an interior of the outer casing and that accommodates the inner casing in a state where an extension direction of the inner casing is the same as an extension direction of the outer casing;
an opening that is formed in a wall portion of the outer casing extending along the extension direction of the outer casing and that is used to insert the inner casing into the accommodation spacing;
a cover that closes the opening;
an eye cup portion that accommodates the optical system and that is attached to a rearward end of the outer casing;

a stopper that stops forward movement of the inner casing in a state where the inner casing is accommodated in the accommodation spacing and the opening is closed by the cover, the stopper being formed of a stopper wall having a stopper face being formed of a sloped surface changing in shape towards a side of an interior of the accommodation spacing; and a dust prevention cushion interposed in a compressed state between an overall circumferential periphery of a rearwardly facing wall face of the inner casing and an overall circumferential periphery of a forwardly facing wall face of the outer casing inside the outer casing in a state where the forward movement of the inner casing is stopped by the stopper.

10. An image capture apparatus according to claim 9, wherein:

the inner casing has a larger length in the forward-rearward than a left-right width thereof; and the opening extends with a left-right width larger than the left-right width of the inner casing and with a front-rear length larger than the front-rear length of the inner casing.

11. An image capture apparatus according to claim 9, wherein the accommodation spacing is provided close to a forward end of the outer casing in the outer casing.

12. An image capture apparatus according to claim 9, wherein:

the overall circumferential periphery of the rearwardly facing wall face of the inner casing is an overall periphery of a rear end face of the inner casing;

an abutment wall is expansively formed on an inner face where the outer casing faces the accommodation spacing in a portion located rearward of a portion where the opening is formed, to expand on an overall periphery of the inner face in a direction perpendicular to the extension direction of the outer casing and to be integral with the outer casing; and the overall circumferential periphery of the forwardly facing wall face of the outer casing is an overall circumferential periphery of a forwardly facing face of the abutment wall.

13. An image capture apparatus according to claim 9, wherein:

the overall circumferential periphery of the rearwardly facing wall face of the inner casing is an overall periphery of a rear end face of the inner casing;

an abutment wall is expansively formed on an inner face where the outer casing faces the accommodation spacing in a portion located rearward of a portion where the opening is formed, to expand on an overall periphery of the inner face in the direction perpendicular to the extension direction of the outer casing and to be integral with the outer casing; and the overall circumferential periphery of the forwardly facing wall face of the outer casing is an overall circumferential periphery of a forwardly facing face of the abutment wall.

14. An image capture apparatus according to claim 9, wherein:

the outer casing has a cross section shaped as a rectangular frame formed from a lower wall, an upper wall, a lefthand sidewall, and a righthand sidewall;

a front wall connecting between a forward end of the upper wall and forward ends of the lefthand and righthand sidewalls;

the lower wall is located in a near-rear end portion of the outer casing; and the opening extends from a forward end of the lower wall to a lower end of the front wall between lower ends of the lefthand and righthand sidewalls.

15. An image capture apparatus according to claim 9, further comprising a camera body, wherein:

the electronic view finder assembly is provided in a rear portion of an upper face of the camera body;

the forward end of the outer casing is pivotally joined to the camera body to be vertically pivotable; and the opening is provided to a lower face where the outer casing faces downward.

16. An image capture apparatus including an electronic view finder assembly comprising:

a liquid crystal display device that displays on a display surface an image generated by an image capture element;

a back light that illuminates the liquid crystal display device;

an optical system that magnifies the image that is to be displayed on the display surface; and a casing comprising:

an inner casing that accommodates the liquid crystal display device and the back light, wherein the inner casing is cylindrical in cross-sectional shape and extends in a forward-rearward direction;

an outer casing having a cylindrical shape and a cross section larger in size than a cross section of the inner casing, wherein the outer casing extends in the forward-rearward direction, wherein the outer casing has a cross section shaped as a rectangular frame and formed from a lower wall, an upper wall, a lefthand sidewall, a righthand sidewall, and a front wall connecting between a forward end of the upper wall and forward ends of the lefthand and righthand sidewalls;

an accommodation spacing that is provided in an interior of the outer casing and that accommodates the inner casing in a state where an extension direction of the inner casing is the same as an extension direction of the outer casing;

an opening that is formed in a wall portion of the outer casing extending along the extension direction of the outer casing and that is used to insert the inner casing into the accommodation spacing;

a cover that closes the opening;

an eye cup portion that accommodates the optical system and that is attached to a rearward end of the outer casing;

a stopper that stops forward movement of the inner casing in a state where the inner casing is accommodated in the accommodation spacing and the opening is closed by the cover; and a dust prevention cushion interposed in a compressed state between an overall circumferential periphery of a rearwardly facing wall face of the inner casing and an overall circumferential periphery of a forwardly facing wall face of the outer casing inside the outer casing in a state where the forward movement of the inner casing is stopped by the stopper.

* * * * *

UNITED STATES PATENT AND TRADEMARK OFFICE
CERTIFICATE OF CORRECTION

PATENT NO. : 7,689,118 B2 Page 1 of 1
APPLICATION NO. : 11/599453
DATED : March 30, 2010
INVENTOR(S) : Tokusuke Tsujimoto It is certified that error appears in the above-identified patent and that said Letters Patent is hereby corrected as shown below:

In claim 7, column 12, line 22, "extention" (both occurrences) should read --extension--.

In claim 7, column 12, line 23, "extention" should read --extension--.

Signed and Sealed this

Thirteenth Day of July, 2010

David J. Kappos
*Director of the United States Patent and Trademark Office*